(12) United States Patent
Matsumoto et al.

(10) Patent No.: US 11,906,014 B2
(45) Date of Patent: Feb. 20, 2024

(54) ASSEMBLY, SHOCK ABSORBER, AND METHOD FOR MANUFACTURING ASSEMBLY

(71) Applicant: Hitachi Astemo, Ltd., Ibaraki (JP)

(72) Inventors: Hiroyuki Matsumoto, Hitachinaka (JP); Satsuki Yamamoto, Hitachinaka (JP); Chigaya Sekine, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 48 days.

(21) Appl. No.: 17/629,666

(22) PCT Filed: Jul. 21, 2020

(86) PCT No.: PCT/JP2020/028290
§ 371 (c)(1),
(2) Date: Jan. 24, 2022

(87) PCT Pub. No.: WO2021/020234
PCT Pub. Date: Feb. 4, 2021

(65) Prior Publication Data
US 2022/0252126 A1    Aug. 11, 2022

(30) Foreign Application Priority Data
Jul. 26, 2019   (JP) ................................ 2019-137808

(51) Int. Cl.
*B23P 11/00*    (2006.01)
*F16F 9/32*    (2006.01)
(Continued)

(52) U.S. Cl.
CPC ............ *F16F 9/3271* (2013.01); *F16B 19/06* (2013.01); *B60G 2206/8102* (2013.01); *F16F 9/348* (2013.01); *F16F 2226/04* (2013.01)

(58) Field of Classification Search
CPC ...... F16F 9/3271; F16F 9/348; F16F 2226/04; F16F 9/3207; F16F 9/185; F16F 9/18;
(Continued)

(56) References Cited

U.S. PATENT DOCUMENTS

2017/0254380 A1*  9/2017  Ankney ................ F16F 9/3481

FOREIGN PATENT DOCUMENTS

| EP | 0230042 A1 | 7/1987 |
|----|------------|--------|
| JP | 11-037117 A | 2/1999 |

(Continued)

OTHER PUBLICATIONS

International Search Report dated Aug. 25, 2020 in International Patent Application No. PCT/JP2020/028290.
(Continued)

*Primary Examiner* — Jun S Yoo
(74) *Attorney, Agent, or Firm* — Mattingly & Malur, PC (57) ABSTRACT

This assembly includes a plurality of stacked circular members, and a fixing pin that is disposed inside each of the circular members to arrange and integrate each of the circular members in an axial direction thereof. The fixing pin includes a shaft portion extending in the axial direction, a flange portion extending radially outward from one end side of the shaft portion, a recessed portion that is provided on an end face of the shaft portion on the other side and has a non-circular cross-section orthogonal to the axial direction, and one or a plurality of protruding portions that are provided on an outer circumferential portion of the shaft portion on the other end side and protrude radially outward from an inner circumferential surface of each of the circular members.

4 Claims, 6 Drawing Sheets

(51) Int. Cl.
   *F16B 19/06* (2006.01)
   *F16F 9/348* (2006.01)
(58) Field of Classification Search
   CPC .. F16F 9/32; F16F 9/3484; F16F 9/187; F16F 9/325; F16F 9/34; F16B 19/06; F16B 17/006; F16B 19/08; F16B 19/05; B60G 2206/8102; B60G 2206/8209; B60G 2206/8103
   See application file for complete search history.

(56) References Cited

FOREIGN PATENT DOCUMENTS

| | | | |
|---|---|---|---|
| JP | 62-107131 U | | 2/1999 |
| JP | 2001-003919 A | | 1/2001 |
| JP | 2014-009756 A | | 1/2014 |
| JP | 2014009756 A | * | 1/2014 |
| JP | 2014047819 A | | 3/2014 |
| WO | WO-2010092640 A1 | * | 8/2010 .............. F16C 11/10 |

OTHER PUBLICATIONS

Written Opinion dated Aug. 25, 2020 in International Patent Application No. PCT/JP2020/028290.

* cited by examiner

ASSEMBLY, SHOCK ABSORBER, AND METHOD FOR MANUFACTURING ASSEMBLY

TECHNICAL FIELD

The present invention relates to an assembly, a shock absorber, and a method for manufacturing an assembly.

Priority is claimed on Japanese Patent Application No. 2019-137808, filed Jul. 26, 2019, the content of which is incorporated herein by reference.

BACKGROUND ART

There is an assembly in which a fixing pin is inserted into a plurality of stacked circular members to integrate them in an axial direction thereof (see, for example, Patent Literature 1 below).

CITATION LIST

Patent Document

[Patent Document 1]
Japanese Unexamined Patent Application, First publication No. 2014-009756

SUMMARY OF INVENTION

Problems to be Solved by the Invention

In the assembly, assembly accuracy may decrease depending on how the fixing pin is attached.

The present invention provides an assembly, a shock absorber, and a method for manufacturing an assembly, in which a decrease in assembly accuracy can be inhibited.

Means for Solving the Problem

One aspect of the present invention is an assembly including a plurality of stacked circular members, and a fixing pin that is disposed inside each of the circular members to arrange and integrate each of the circular members in an axial direction thereof, in which the fixing pin includes a shaft portion extending in the axial direction, a flange portion extending radially outward from one end side of the shaft portion, a recessed portion that is provided on an end face of the shaft portion on the other side and has a non-circular cross-section orthogonal to the axial direction, and one or a plurality of protruding portions that are provided on an outer circumferential portion of the shaft portion on the other end side and protrude radially outward from an inner circumferential surface of each of the circular members.

Further, one aspect of the present invention includes a cylinder, a piston provided in the cylinder, a rod of which one end is connected to the piston and the other end extends from the cylinder, and a body valve that defines the cylinder into two chambers, in which the body valve includes a valve body having a liquid passage, at least one disc-shaped valve member that opens and closes the liquid passage, and a fixing pin that is disposed inside the valve body and the valve member to arrange and integrate the valve body and the valve member in an axial direction thereof, and the fixing pin includes a shaft portion extending in the axial direction, a flange portion extending radially outward from one end side of the shaft portion, a recessed portion that is provided on an end face of the shaft portion on the other side and has a non-circular cross-section orthogonal to the axial direction of the shaft portion, and one or a plurality of protruding portions that are provided on an outer circumferential portion of the shaft portion on the other end side and protrude radially outward from an inner circumferential surface of the valve member.

Further, one aspect of the present invention is a method for manufacturing an assembly in which a fixing pin is disposed inside a plurality of stacked circular members to arrange and integrate the circular members in an axial direction thereof, and which includes: a shaft portion insertion step of inserting a shaft portion of the fixing pin into the plurality of circular members, the fixing pin including the shaft portion extending in the axial direction and a flange portion extending radially outward from one end side of the shaft portion; and an integration step of inserting a non-circular punch having the maximum diameter larger than the minimum diameter of the recessed portion into a non-circular recessed portion provided on an end face of the shaft portion on the other end side to rotate the punch, plastically deforming an outer circumferential portion of the shaft portion on the other end side to protrude radially outward from an inner circumferential surface of the circular members, and integrating the plurality of circular members with the fixing pin.

Effects of the Invention

According to each aspect mentioned above, a decrease in assembly accuracy can be reduced.

EMBODIMENTS FOR IMPLEMENTING THE INVENTION

Embodiments and modified examples of the present invention will be described below with reference to the drawings. Since "axes" used in the following description are substantially coaxial with each other, they may be described using a common "center axis CL" or "axis CL." Further, in the following description, a direction along the axis CL may be referred to as an "axial direction," and a direction perpendicular to the axis CL may be referred to as a "radial direction."

First Embodiment

A shock absorber including a body valve, which is an assembly of a first embodiment of the present invention, and a method for manufacturing the shock absorber will be described below with reference to FIGS. 1 to 7.

Figure 1:
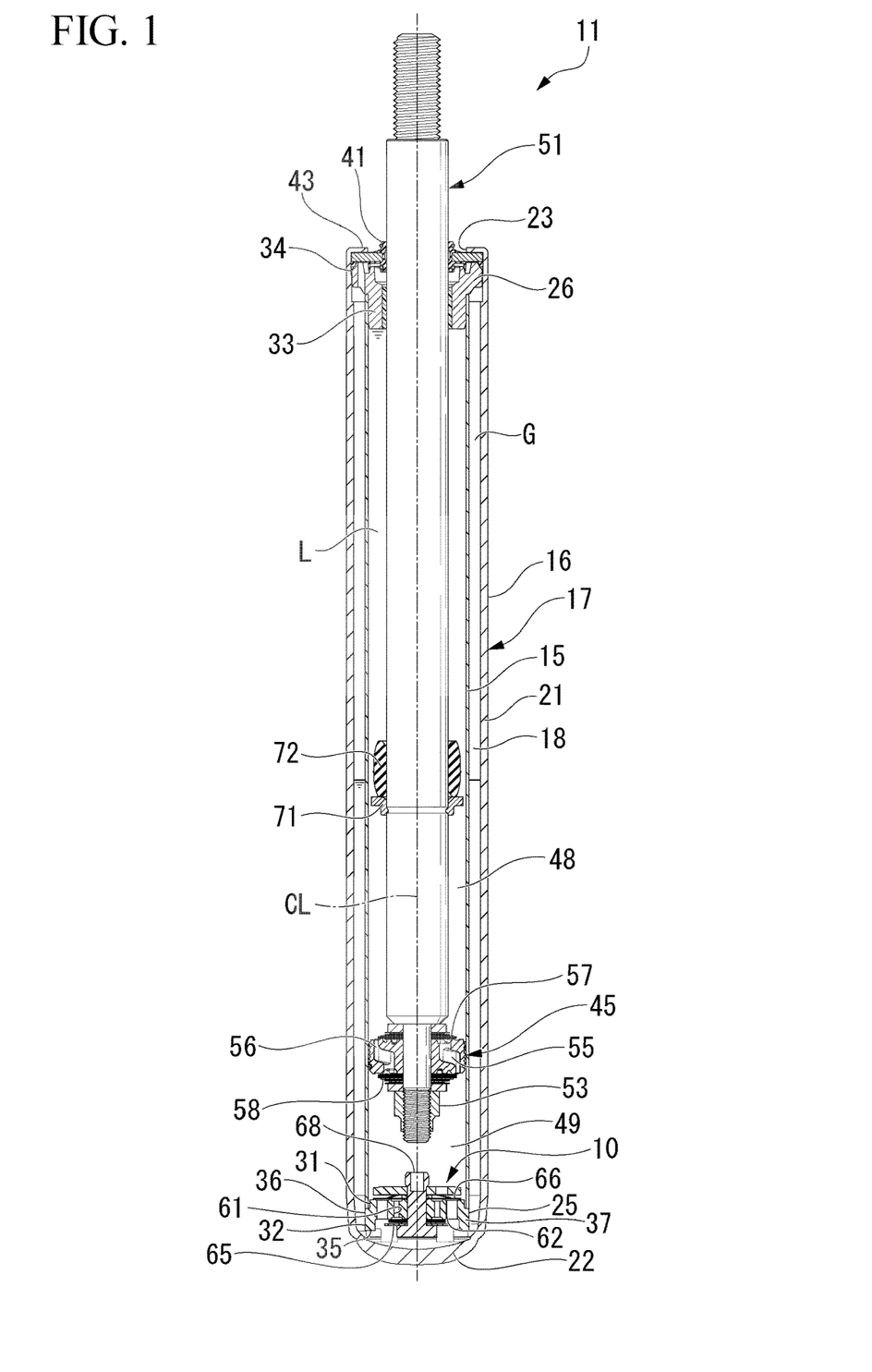
FIG. 1 is a diagram showing a first embodiment of the present invention and is a vertical cross-sectional view of a shock absorber including a body valve as an assembly.

FIG. 1 shows a shock absorber 11 including a body valve 10, which is an assembly of the present embodiment. The shock absorber 11 is used as a suspension device for a vehicle such as an automobile or a railroad vehicle. Specifically, the shock absorber 11 is used for a strut type suspension of an automobile. The shock absorber 11 is a double cylinder type. That is, the shock absorber 11 includes a cylinder 17 that has a cylindrical inner cylinder 15, and a bottomed cylindrical outer cylinder 16 that has a diameter larger than that of the inner cylinder 15 and is provided on an outer circumferential side of the inner cylinder 15. A reservoir chamber 18 is formed between an inner circumferential surface of the outer cylinder 16 and an outer circumferential surface of the inner cylinder 15.

The outer cylinder 16 is an integrally molded product made of one metal member. The outer cylinder 16 has a cylindrical side wall portion 21, a bottom portion 22 that closes one axial end of the side wall portion 21, and an opening 23 on a side opposite to the bottom portion 22 of the side wall portion 21. That is, the outer cylinder 16 covers the inner cylinder 15, the one axial end is closed, and the other axial end is open. Further, in other words, the outer cylinder 16 has the bottom portion 22 at the one end and an opening 23 at the other end.

The inner cylinder 15 is an integrally molded product made of one metal member and has a cylindrical shape.

The shock absorber 11 has an annular valve body 25 (circular member) provided at one axial end portion of the inner cylinder 15, and an annular rod guide 26 provided at the other axial ends of the inner cylinder 15 and the outer cylinder 16. The valve body 25 constitutes the body valve 10 and has a small diameter portion 31, and a large diameter portion 32 having a larger diameter than the small diameter portion 31 on an outer circumferential portion thereof. The rod guide 26 also has a small diameter portion 33, and a large diameter portion 34 having a larger diameter than the small diameter portion 33 on an outer circumferential portion thereof.

The inner cylinder 15 is fitted to the small diameter portion 31 of the valve body 25 until one axial end portion thereof abuts the large diameter portion 32 in the axial direction. The inner cylinder 15 is fixed to the bottom portion 22 of the outer cylinder 16 via the valve body 25. In addition, the inner cylinder 15 is fitted to the small diameter portion 33 of the rod guide 26 until the other axial end portion thereof abuts the large diameter portion 34 in the axial direction. The inner cylinder 15 is fixed to a side wall portion 21 of the outer cylinder 16 via the rod guide 26. In this state, a relative radial position of the inner cylinder 15 is fixed with respect to the outer cylinder 16. A space between the valve body 25 and the bottom portion 22 communicates with a space between the inner cylinder 15 and the outer cylinder 16 via a passage groove 35 formed at a position of the large diameter portion 32 of the valve body 25. The space between the valve body 25 and the bottom portion 22 also constitutes a part of the reservoir chamber 18, similarly to the space between the inner cylinder 15 and the outer cylinder 16.

The valve body 25 has a main body portion 36 and a leg portion 37. The main body portion 36 has a portion of the large diameter portion 32 located on the small diameter portion 31 side in the axial direction, and a perforated and disc-shaped portion in which the small diameter portion 31 is formed. The leg portion 37 is an annular portion in which a portion of the large diameter portion 32 on a side opposite to the small diameter portion 31 in the axial direction is formed. The above-mentioned passage groove 35 is formed in a portion of the leg portion 37 on a side opposite to the main body portion 36 to penetrate the leg portion 37 in the radial direction.

The shock absorber 11 has an annular closing member 41 on a side of the rod guide 26 opposite to the bottom portion 22. The closing member 41 is also fitted to an inner circumferential portion of the side wall portion 21 in the same manner as the rod guide 26. A caulked portion 43, in which the side wall portion 21 is plastically deformed inward in the radial direction by a caulking process such as curling, is formed at an end portion of the side wall portion 21 on a side opposite to the bottom portion 22. The closing member 41 is sandwiched between the caulked portion 43 and the rod guide 26. The closing member 41 closes the opening 23 of the outer cylinder 16 and is specifically an oil seal. The closing member 41 may be formed of a seal washer.

The shock absorber 11 has a piston 45 provided in the cylinder 17. The piston 45 is slidably fitted into the inner cylinder 15. The piston 45 divides the inside of the inner cylinder 15 into two chambers, a first chamber 48 and a second chamber 49. The first chamber 48 is provided between the piston 45 and the rod guide 26 in the inner cylinder 15. The second chamber 49 is provided between the piston 45 and the valve body 25 in the inner cylinder 15. The second chamber 49 is separated from the reservoir chamber 18 by the valve body 25. A liquid oil L, which is a working fluid, is filled in the first chamber 48 and the second chamber 49. A gas G and the liquid oil L, which are working fluids, are filled in the reservoir chamber 18.

The shock absorber 11 has a rod 51. One end of the rod 51 is connected to the piston 45, and the other end extends from the outer cylinder 16 of the cylinder 17 to the outside through the opening 23. The piston 45 is connected to the rod 51 by a nut 53. The rod 51 extends to the outside of the inner cylinder 15 and the outer cylinder 16 through the rod guide 26 and the closing member 41. The rod 51 moves in the axial direction together with the piston 45 with respect to the inner cylinder 15 and the outer cylinder 16 while being guided by the rod guide 26.

The closing member 41 closes a space between the opening 23 at the other end of the outer cylinder 16 and the rod 51, and restricts the liquid oil L in the inner cylinder 15 and the gas G and the liquid oil L in the reservoir chamber 18 from leaking to the outside.

A passage 55 and a passage 56 penetrating in the axial direction are formed in the piston 45. The passages 55 and 56 allow communication between the first chamber 48 and the second chamber 49. The shock absorber 11 has an annular disc valve 57, which can close the passage 55 by abutting the piston 45, on a side of the piston 45 opposite to the bottom portion 22 in the axial direction. Further, the shock absorber 11 has an annular disc valve 58, which can close the passage 56 by abutting the piston 45, on the bottom portion 22 side of the piston 45 in the axial direction. The disc valves 57 and 58 are connected to the rod 51 together with the piston 45. The passage 55 opens to the second chamber 49, and the passage 56 opens to the first chamber 48.

When the rod 51 moves to a contraction side, on which an amount of entry thereof into the inner cylinder 15 and the outer cylinder 16 increases, to move the piston 45 in a direction in which the second chamber 49 narrows, and thus a pressure in the second chamber 49 becomes higher than a pressure in the first chamber 48 by a predetermined value or more, the disc valve 57 opens the passage 55 to allow the liquid oil L in the second chamber 49 to flow to the first chamber 48, which generates a damping force at that time.

When the rod 51 moves to an extension side, on which an amount of protrusion thereof from the inner cylinder 15 and the outer cylinder 16 increases, to move the piston 45 in a direction in which the first chamber 48 narrows, and thus the pressure in the first chamber 48 becomes higher than the pressure in the second chamber 49 by a predetermined value or more, the disc valve 58 opens the passage 56 to allow the liquid oil L in the first chamber 48 to flow to the second chamber 49, which generates a damping force at that time.

A fixed orifice (not shown) is formed in at least one of the piston 45 and the disc valve 57, that provides communication between the first chamber 48 and the second chamber 49 via the passage 55 even in a state in which the passage 55 is most closed by the disc valve 57.

Also, a fixed orifice (not shown) is formed in at least one of the piston 45 and the disc valve 58, that provides communication between the first chamber 48 and the second chamber 49 via the passage 56 even in a state in which the passage 56 is most closed by the disc valve 58.

Liquid passages 61 and liquid passages 62 penetrating in the axial direction are formed in the valve body 25. The liquid passages 61 and 62 allow communication between the second chamber 49 and the reservoir chamber 18. The body valve 10 has an annular disc valve 65, which can close the liquid passages 61 by abutting the valve body 25, on the bottom portion 22 side of the valve body 25 in the axial direction. Further, the body valve 10 has an annular disc valve 66 (a circular member or a valve member), which can close the liquid passages 62 by abutting the valve body 25, on a side opposite to the bottom portion 22 of the valve body 25 in the axial direction. The body valve 10 has a fixing pin 68, and the disc valves 65 and 66 are connected to the valve body 25 by the fixing pin 68.

The body valve 10 configured of the valve body 25, the disc valves 65 and 66, the fixing pin 68, and the like defines the inside of the cylinder 17 into two chambers, the second chamber 49 and the reservoir chamber 18. The liquid passages 61 always communicate with the second chamber 49. The liquid passages 62 always communicate with the reservoir chamber 18.

In the body valve 10, when the rod 51 moves to the contraction side to move the piston 45 in the direction in which the second chamber 49 narrows, and thus the pressure in the second chamber 49 becomes higher than a pressure in the reservoir chamber 18 by a predetermined value or more, the disc valve 65 opens the liquid passages 61, which generates a damping force at that time.

In the body valve 10, when the rod 51 moves to the extension side to move the piston 45 in the direction in which the first chamber 48 narrows, and thus the pressure of the second chamber 49 becomes lower than the pressure of the reservoir chamber 18, the disc valve 66 opens the liquid passages 62. The disc valve 66 is a suction valve that allows the liquid oil L to flow from the reservoir chamber 18 into the second chamber 49 without substantially generating a damping force at that time.

A locking member 71 is fixed to the rod 51 at a position between the piston 45 and the rod guide 26. A cushioning member 72 is provided at a position between the locking member 71 and the rod guide 26. The cushioning member 72 abuts the locking member 71, and when the rod 51 moves to a predetermined position on the extension side, the cushioning member 72 abuts the rod guide 26 to cushion an impact.

Figure 2:
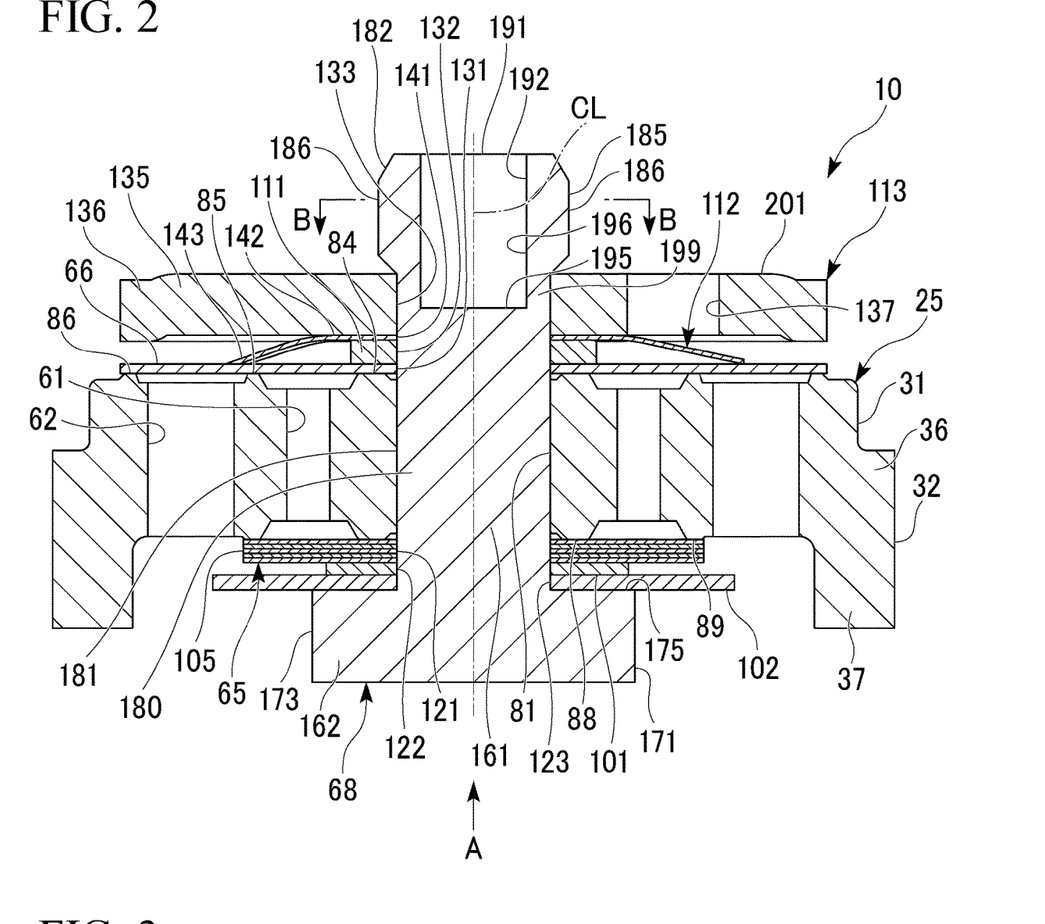
FIG. 2 is a diagram showing the body valve and is a vertical cross-sectional view at a cross-section thereof including an axis CL.

As shown in FIG. 2, the valve body 25 has an annular shape and is made of a metal. In the valve body 25, an inner circumferential surface 81 of the main body portion 36 at a radial center thereof is a cylindrical surface. In addition, an annular fixed seat portion 84 that protrudes in the axial direction at a position radially outward from the inner circumferential surface 81, an annular inner seat portion 85 that protrudes in the axial direction at a position radially outward from the fixed seat portion 84, and an annular outer seat portion 86 that protrudes in the axial direction at a position radially outward from the inner seat portion 85 are formed in the valve body 25 on a side of the main body portion 36 opposite to the leg portion 37 in the axial direction.

Further, an annular fixed seat portion 88 that protrudes in the axial direction at a position radially outward from the inner circumferential surface 81, and an annular seat portion 89 that protrudes in the axial direction at a position radially outward from the fixed seat portion 88 and radially inward from the leg portion 37 are formed in the valve body 25 on the leg portion 37 side of the main body portion 36 in the axial direction.

In the axial direction of the valve body 25, height positions of the fixed seat portion 84, the inner seat portion 85, and the outer seat portion 86 coincide with each other, and a height of the seat portion 89 in the protruding direction is slightly higher than that of the fixed seat portion 88.

The liquid passages 61 penetrate the main body portion 36 in the axial direction such that one end thereof opens between the fixed seat portion 84 and the inner seat portion 85, and the other end thereof opens between the fixed seat portion 88 and the seat portion 89. The liquid passages 61 are formed at a plurality of locations at intervals in a circumferential direction of the valve body 25.

The liquid passages 62 penetrate the main body portion 36 in the axial direction. One end of the liquid passages 62 opens between the inner seat portion 85 and the outer seat portion 86, and the other end opens between the seat portion 89 and the leg portion 37. The liquid passages 62 are formed at a plurality of locations at intervals in the circumferential direction of the valve body 25.

The body valve 10 has the disc valve 65, a disc 101 (a circular member or a valve member), and a restriction disc 102 (a circular member or a valve member) on the leg portion 37 side of the main body portion 36 in the axial direction in order from a side closer to the main body portion 36 when viewed in the axial direction. The disc valve 65 is configured of a plurality of discs 105 (circular members or valve members). The disc 101, the restriction disc 102, and the plurality of discs 105 are all perforated, disc-shaped, and made of a metal.

The body valve 10 has the disc valve 66, a disc 111 (a circular member or a valve member), a spring disc 112 (a circular member or a valve member), and a washer 113 (a circular member or a valve member) on a side of the main body portion 36 opposite to the leg portion 37 when viewed in the axial direction in order from a side closer to the main body portion 36. The disc valve 66, the disc 111, the spring disc 112, and the washer 113 are all perforated, disc-shaped, and made of a metal.

An inner circumferential surface 121 of each of the plurality of discs 105 at a center thereof in the radial direction is a cylindrical surface. An inner circumferential surface 122 of the disc 101 at a center thereof in the radial direction is also a cylindrical surface. An inner circumferential surface 123 of the restriction disc 102 at a center thereof in the radial direction is also a cylindrical surface. An inner circumferential surface 131 of the disc valve 66 at a center thereof in the radial direction is also a cylindrical surface. An inner circumferential surface 132 of the disc 111 at a center thereof in the radial direction is also a cylindrical surface. An inner circumferential surface 133 of the washer 113 at a center thereof in the radial direction is also a cylindrical surface.

The washer 113 has a disc-shaped main plate portion 135 extending from the inner circumferential surface 133 to a middle portion thereof in the radial direction, and an annular portion 136 located at an outer end portion thereof in the radial direction. The annular portion 136 is displaced to one side in the axial direction with respect to the main plate portion 135. A passage hole 137 penetrating the washer 113 in the axial direction is formed in the main plate portion 135 of the washer 113. The washer 113 is attached such that the annular portion 136 protrudes toward the valve body 25 in the axial direction with respect to the main plate portion 135.

The spring disc 112 has an annular spring base 142, and a plurality of spring leg portions 143 extending radially outward from the spring base 142. An inner circumferential surface 141 of the spring base 142 at a center thereof in the radial direction is a cylindrical surface. The spring leg portion 143 is inclined with respect to the spring base 142 such that a portion protruding further from the spring base 142 is located toward one side of the spring base 142 in the axial direction.

The inner peripheral surfaces 121 to 123, 131 to 133, and 141 are formed to have the same inner diameter as the inner circumferential surface 81 of the valve body 25.

The fixing pin 68 is made of a metal, specifically iron. The fixing pin 68 has a shaft portion 161 extending in the axial direction, and a flange portion 162 extending radially outward from one axial end side of the shaft portion 161. In other words, the flange portion 162 is provided at one end of the shaft portion 161 and has a larger diameter than that of the shaft portion 161. The shaft portion 161 is inserted into each of the inner circumferential surface 123 of the restriction disc 102, the inner circumferential surface 122 of the disc 101, the inner circumferential surface 121 of each of the plurality of discs 105, the inner circumferential surface 81 of the valve body 25, the inner circumferential surface 131 of the disc valve 66, the inner circumferential surface 132 of the disc 111, the inner circumferential surface 141 of the spring disc 112, and the inner circumferential surface 133 of the washer 113. In this case, the valve body 25 is disposed in a direction in which the leg portion 37 protrudes from the main body portion 36 toward the flange portion 162 side in the axial direction. In addition, in this case, the spring disc 112 is disposed in a direction in which the spring leg portions 143 extend from the spring base 142 toward the valve body 25 side in the axial direction. Also, in this case, the washer 113 is disposed in a direction in which the annular portion 136 protrudes from the main plate portion 135 toward the valve body 25 side in the axial direction.

Figure 3:
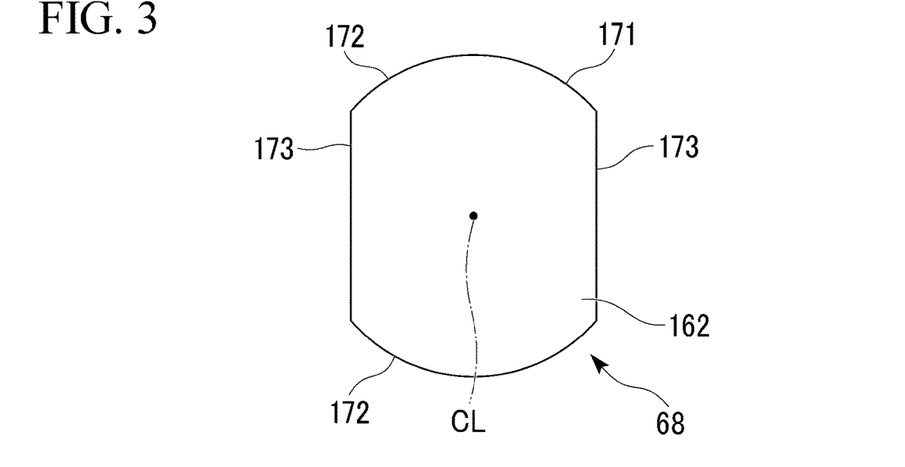
FIG. 3 is a view showing a fixing pin of the body valve and is a bottom view in the direction of an arrow A in FIG. 2.

As shown in FIG. 3, the flange portion 162 has a non-circular outer circumferential surface 171 and includes a pair of curved surface portions 172 that forms a part of a cylindrical surface coaxial with the shaft portion 161 shown in FIG. 2, and a pair of flat surface portions 173 that connect end portions of the pair of curved surface portions 172 on sides closer to each other. As shown in FIG. 2, the pair of flat surface portions 173 are parallel to a central axis CL of the shaft portion 161 and are disposed at positions equidistant from the central axis CL of the shaft portion 161 in a side view. The pair of flat surface portions 173 are parallel to each other. A distance between the pair of flat surface portions 173 is the minimum outer diameter of the flange portion 162, and this minimum outer diameter is larger than inner diameters of the inner circumferential surfaces 81, 121 to 123, 131 to 133, and 141. The flange portion 162 abuts the restriction disc 102 at a root surface 175 thereof on the shaft portion 161 side. The root surface 175 is a flat surface widening in a direction orthogonal to the axis CL of the fixing pin 68.

The shaft portion 161 has a shaft body portion 180. The shaft body portion 180 has an outer circumferential surface 181 formed of a cylindrical surface extending from the root surface 175 of the flange portion 162, and an inclined surface 182 located at an end portion thereof on a side opposite to the flange portion 162. The shaft body portion 180 of the shaft portion 161 is inserted to, in a state in which there is almost no gap in the radial direction, the inside of the inner circumferential surface 123 of the restriction disc 102, the inside of the inner circumferential surface 122 of the disc 101, the inside of each inner circumferential surface 121 of the plurality of discs 105, the inside of the inner circumferential surface 81 of the valve body 25, the inside of the inner circumferential surface 131 of the disc valve 66, the inside of the inner circumferential surface 132 of the disc 111, the inside of the inner circumferential surface 141 of the spring disc 112, and the inside of the inner circumferential surface 133 of the washer 113.

Figure 4:
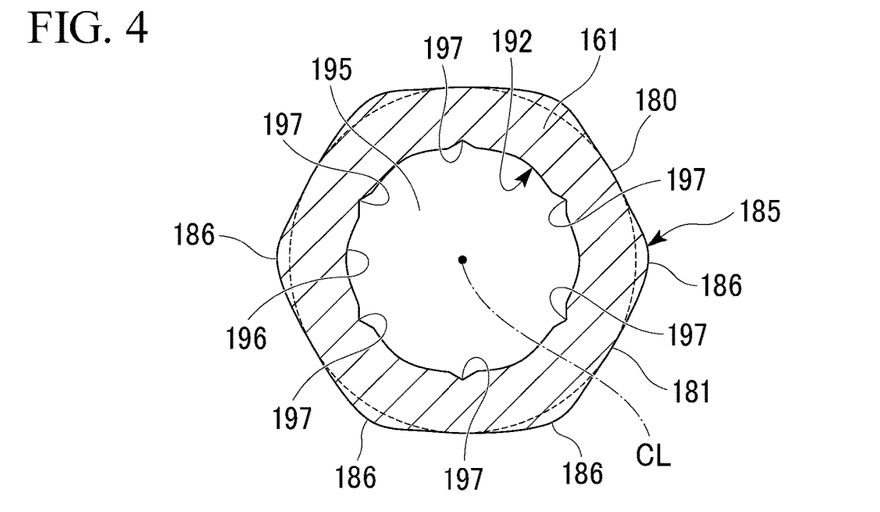
FIG. 4 is a diagram showing a shaft portion of a fixing pin of the body valve and is a cross-sectional view along line B-B in FIG. 2.

The shaft portion 161 has a locking portion 185 on a side opposite to the flange portion 162 and at a portion protruding from the washer 113. The locking portion 185 has a plurality of protruding portions 186 that protrude radially outward from the shaft body portion 180 at a portion of the shaft body portion 180 that protrudes from the washer 113 in the axial direction. As shown in FIG. 4, the protruding portions 186 are formed at six positions at substantially equal angular intervals in the circumferential direction of the shaft portion 161. By forming the protruding portions 186 at six positions, an outer circumferential portion of the locking portion 185 has a substantially hexagonal shape. The protruding portions 186 are provided on the other end side of the shaft portion 161 on a side opposite to the flange portion 162 provided on one end side of the outer circumferential portion of the shaft portion 161. The protruding portions 186 protrude radially outward from the shaft body portion 180 by about 0.5 mm.

As shown in FIG. 2, in the shaft portion 161, an axially recessed portion 192 (a recessed portion) recessed from an end face 191 thereof toward the flange portion 162 side in the axial direction of the shaft portion 161 is formed at the end face 191 on the other end side opposite to the flange portion 162 provided on one end side in the axial direction. As shown in FIG. 4, the axially recessed portion 192 has a bottom surface 195 on a deeper side of the shaft portion 161 in the axial direction, a base inner circumferential surface 196 having a substantially cylindrical shape centered on the central axis CL of the shaft portion 161, and a plurality of radially recessed portions 197 recessed radially outward from the base inner circumferential surface 196. The bottom surface 195 is widened to be substantially orthogonal to the central axis CL of the shaft portion 161. The radially recessed portions 197 are formed at six locations, which is the same number as the protruding portions 186, at substantially equal intervals in the circumferential direction of the shaft portion 161. All of these radially recessed portions 197 are disposed at substantially a central position between the protruding portions 186 adjacent to each other in the circumferential direction of the shaft portion 161. Accordingly, the axially recessed portion 192 has a non-circular cross-section orthogonal to the axial direction of the shaft portion 161.

The radially recessed portion 197 has a predetermined angular relationship with the outer circumferential surface 171 of the flange portion 162 formed in a non-circular shape as shown in FIG. 3. Specifically, a direction connecting a set of the radially recessed portions 197 disposed at 180° different positions in the circumferential direction of the axially recessed portion 192 is along the flat surface portions 173 of the flange portion 162 shown in FIG. 3.

As shown in FIG. 2, positions of the protruding portions 186 overlap the axially recessed portion 192 over the entire lengths thereof in the axial direction of the shaft portion 161. The shaft portion 161 has a thinned portion 199 in which a portion of the axially recessed portion 192 between the bottom surface 195 and the protruding portions 186 is thinner than a portion in which the protruding portions 186 are formed and a portion in which the axially recessed portion 192 is not formed.

A distance from the central axis CL of the shaft portion 161 to a protruding tip of the protruding portion 186 in the radial direction is larger than a radius of the inner circumferential surfaces 81, 121 to 123, 131 to 133, and 141. Accordingly, the plurality of protruding portions 186 are located at positions protruding radially outward from the positions of the inner circumferential surfaces 123, 122, 121, 81, 131, 132, 141, and 133 of the restriction disc 102, the disc 101, a plurality of discs 105, the valve body 25, the disc valve 66, the disc 111, the spring disc 112, and the washer 113.

Among the restriction disc 102, the disc 101, the plurality of discs 105, the valve body 25, the disc valve 66, the disc 111, the spring disc 112, and the washer 113 that are stacked, the flange portion 162 of the fixing pin 68 abuts the restriction disc 102, which is located on one end side thereof in the stacking direction, on one side in the axial direction. In addition, in the fixing pin 68, the plurality of protruding portions 186 lock the washer 113, which is located on the other end side in the stacking direction, on the other side in the axial direction. In that case, the restriction disc 102 abuts the root surface 175 of the flange portion 162. Further, the washer 113 abuts the plurality of protruding portions 186 on its end face 201 on a side opposite to the flange portion 162 of the main plate portion 135. Thus, the fixing pin 68 sandwiches the restriction disc 102, the disc 101, the plurality of discs 105, the valve body 25, the disc valve 66, the disc 111, the spring disc 112, and the washer 113 between the flange portion 162 and the plurality of protruding portions 186 from both sides in the stacking direction. The end face 201 is a flat surface widening in the direction orthogonal to the axis CL of the washer 113.

The body valve 10 is an assembly in which the restriction disc 102, the disc 101, the plurality of discs 105, the valve body 25, the disc valve 66, the disc 111, the spring disc 112, and the washer 113, which are a plurality of stacked circular members, are integrated in the axial direction by inserting the fixing pin 68 into them. In other words, the body valve 10 is an assembly formed by inserting the fixing pin 68 into each of the valve body 25 having the liquid passages 61 and 62, the disc-shaped restriction disc 102 that opens and closes the liquid passages 61 and 62, the disc 101, the plurality of discs 105, the disc valve 66, the disc 111, the spring disc 112, and the washer 113 and integrating the valve body 25, the restriction disc 102, the disc 101, the plurality of discs 105, the disc valve 66, the disc 111, the spring disc 112, and the washer 113 in the axial direction.

In the assembled body valve 10, the bottom surface 195 of the axially recessed portion 192 of the fixing pin 68 is disposed on a side closer to the flange portion 162 than the end face 201 of the washer 113 located on a side opposite to the side on which the flange portion 162 is located, which is provided on a side most opposite to the flange portion 162 among the restriction disc 102, the disc 101, the plurality of discs 105, the valve body 25, the disc valve 66, the disc 111, the spring disc 112, and the washer 113. A position of the bottom surface 195 of the axially recessed portion 192 in the axis CL direction is aligned with an intermediate position of the washer 113 in the axis CL direction. As shown in FIG. 1, one axial end portion of the inner cylinder 15 is fitted to the small diameter portion 31 of the valve body 25 of the assembled body valve 10.

In the body valve 10, when the rod 51 moves to the contraction side to move the piston 45 in the direction in which the second chamber 49 narrows, and thus the pressure in the second chamber 49 becomes higher than the pressure in the reservoir chamber 18 by a predetermined value or more, a portion on the outer circumferential side of the disc valve 65 is deformed to be separated from the valve body 25 in the axial direction. As a result, the portion on the outer circumferential side of the disc valve 65 separates from the seat portion 89 shown in FIG. 2 and opens the liquid passage 61. Thus, in the inner liquid passage 61 provided in the valve body 25, when the rod 51 moves to the contraction side, the fluid flows from the second chamber 49 toward the reservoir chamber 18 through the passage holes (not shown) of the disc valve 66. In this way, the disc valve 65 is a contraction side disc valve that opens and closes the liquid passage 61 to generate a damping force. The restriction disc 102 limits a movable range of the deformation of the disc valve 65 provided between the restriction disc 102 itself and the valve body 25 by the disc valve 65 abutting the restriction disc 102 itself.

In the body valve 10, when the rod 51 shown in FIG. 1 moves to the extension side to move the piston 45 to the first chamber 48 side, and thus the pressure in the second chamber 49 becomes lower than the pressure in the reservoir chamber 18, the disc valve 66 deforms its portion on the outer circumferential side to be separated from the valve body 25 in the axial direction. As a result, the portion on the outer circumferential side of the disc valve 66 is separated from the outer seat portion 86 shown in FIG. 2 to open the liquid passage 62. The washer 113 limits a movable range of the deformation of the disc valve 66 provided between the washer 113 itself and the valve body 25 by the disc valve 66 abutting the washer 113 itself. The washer 113 is provided on a side most opposite to the valve body 25 among the disc valve 66, the disc 111, the spring disc 112, and the washer 113.

Next, a method for manufacturing the body valve 10 of the first embodiment, which is a part of a method for manufacturing the shock absorber 11, will be described.

Figure 5:
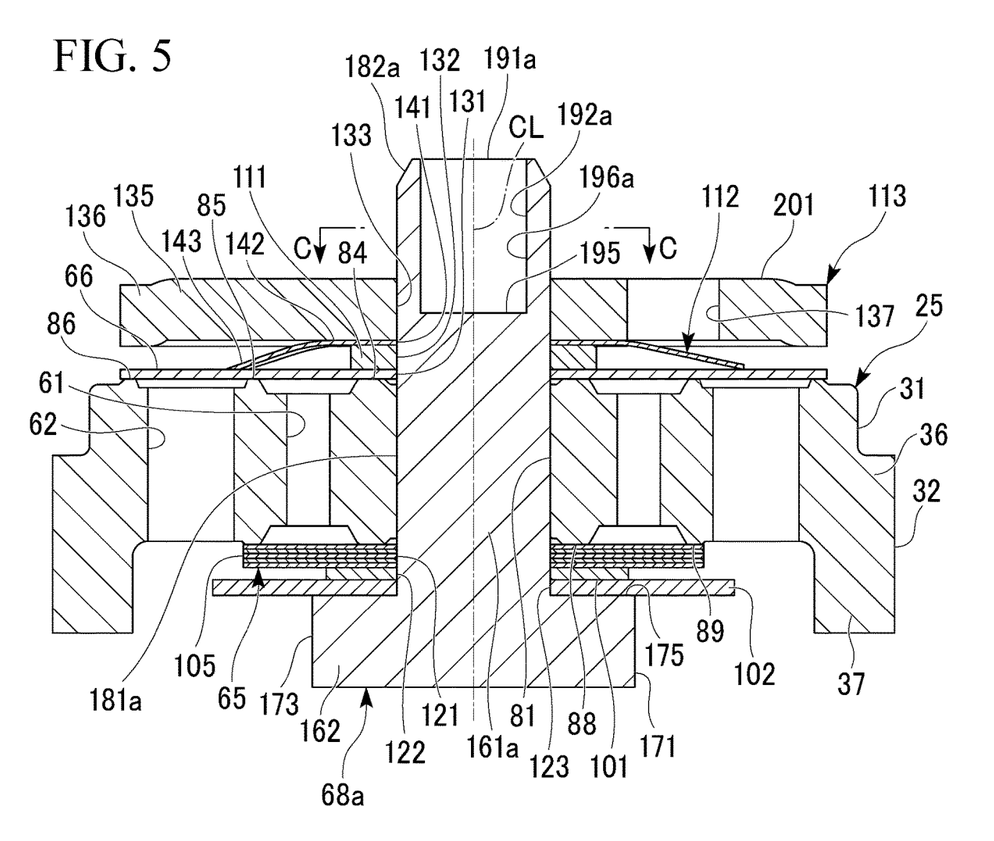
FIG. 5 is a diagram showing a state after a shaft portion insertion step in a method for manufacturing the body valve and is a vertical cross-sectional view at the same cross-section as in FIG. 2.

As shown in FIG. 5, a fixing pin 68a before the disc valves 65 and 66 and the like are assembled to the valve body 25 has a shaft portion 161a extending in the axial direction, and the flange portion 162 extending radially outward from one end side of the shaft portion 161a. The flange portion 162 is the same as after assembly, but the shaft portion 161a is partially different from the shaft portion 161 after assembly.

The shaft portion 161a does not have the plurality of protruding portions 186 formed therein and only has, on its outer circumferential side, an outer circumferential surface 181a configured of a cylindrical surface having the same diameter as the outer circumferential surface 181 of the shaft body portion 180 and an inclined surface 182a disposed on a side opposite to the flange portion 162. The inclined surface 182a is a tapered surface whose diameter becomes smaller as the distance from the flange portion 162 along the axis CL direction increases.

Figure 6:
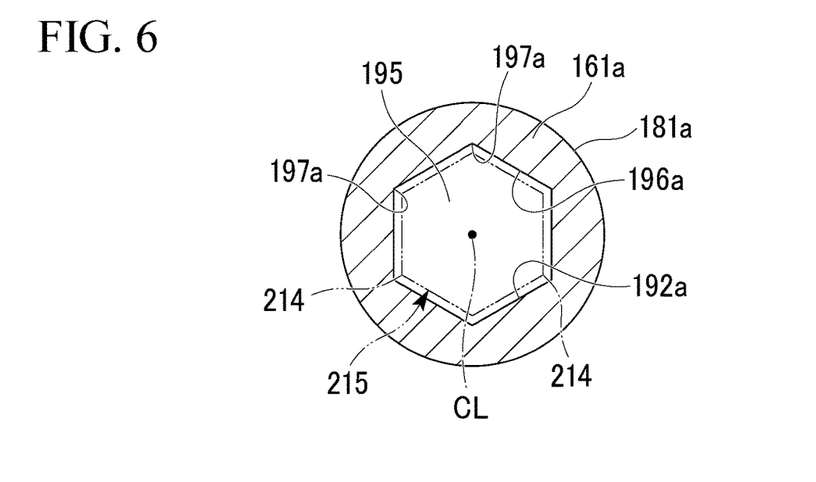
FIG. 6 is a view showing the shaft portion of the fixing pin of the body valve, which is an assembly of the first embodiment, before a punch rotation step and is a cross-sectional view along line C-C in FIG. 5.

An end face 191a on the other end side of the shaft portion 161a provided with the flange portion 162 on one end side widens perpendicularly to the central axis CL of the shaft portion 161a. An axially recessed portion 192a having a non-circular shape is formed on the end face 191a to be recessed from the end face 191a toward the flange portion 162 side in the axial direction. As shown in FIG. 6, a shape of the axially recessed portion 192a perpendicular to the axis CL is a hexagonal hole, and it has a hexagonal cylindrical inner circumferential surface 196a extending in the axis CL direction of the shaft portion 161a, and a bottom surface 195 widening in a direction perpendicular to the central axis CL. The axially recessed portion 192a has a plurality of, specifically, six radially recessed portions 197a that are recessed outward from an inscribed circle thereof. The six radially recessed portions 197a are formed at equal intervals in a circumferential direction of the shaft portion 161a. The axially recessed portion 192a is formed by molding when the shaft portion 161a is shaped.

The axially recessed portion 192a has a predetermined angular relationship between the inner circumferential surface 196a and the outer circumferential surface 171 of the flange portion 162 shown in FIG. 3. Specifically, a direction connecting a predetermined radially recessed portion 197a to another radially recessed portion 197a that are disposed at positions 180° different from each other in the circumferential direction of the axially recessed portion 192a is parallel to the flat surface portions 173 of the flange portion 162.

As shown in FIG. 5, a shaft portion insertion step of inserting such a shaft portion 161a of the fixing pin 68a into the restriction disc 102, the disc 101, the plurality of discs 105, the valve body 25, the disc valve 66, the disc 111, the spring disc 112, and the washer 113 is performed. In this case, the valve body 25 is oriented such that the leg portion 37 protrudes from the main body portion 36 toward the flange portion 162 side in the axial direction. Also, in this case, the spring disc 112 is oriented such that the spring leg portions 143 extend from the spring base 142 toward the valve body 25 side in the axial direction. Further, in this case, the washer 113 is oriented such that the annular portion 136 protrudes from the main plate portion 135 toward the valve body 25 side in the axial direction.

When the shaft portion insertion step is performed, the restriction disc 102 abuts the root surface 175 of the flange portion 162 of the fixing pin 68a, and the restriction disc 102, the disc 101, the plurality of discs 105, the valve body 25, the disc valve 66, the disc 111, the spring disc 112, and the washer 113 are in a state in which they are stacked on the flange portion 162.

Next, the fixing pin 68a, the restriction disc 102, the disc 101, the plurality of discs 105, the valve body 25, the disc valve 66, the disc 111, the spring disc 112, and the washer 113 after the shaft insertion step are set in an integration device (not shown). Then, the integration device holds the outer circumferential surface 171 of the flange portion 162 formed in a non-circular shape and positions the fixing pin 68a in a rotation direction around the central axis CL to be in a state in which movement of the fixing pin 68a in the rotation direction is restricted. This is a restriction step. Further, in the case of performing the shaft portion insertion step for the fixing pin 68a set in the integration device, when the fixing pin 68a is set in the integration device before the shaft portion insertion step, the integration device holds the outer circumferential surface 171 of the flange portion 162 and positions the fixing pin 68a in the rotation direction to be in a state in which the movement of the fixing pin 68a is restricted in the rotation direction. This becomes a restriction step.

Figure 7:
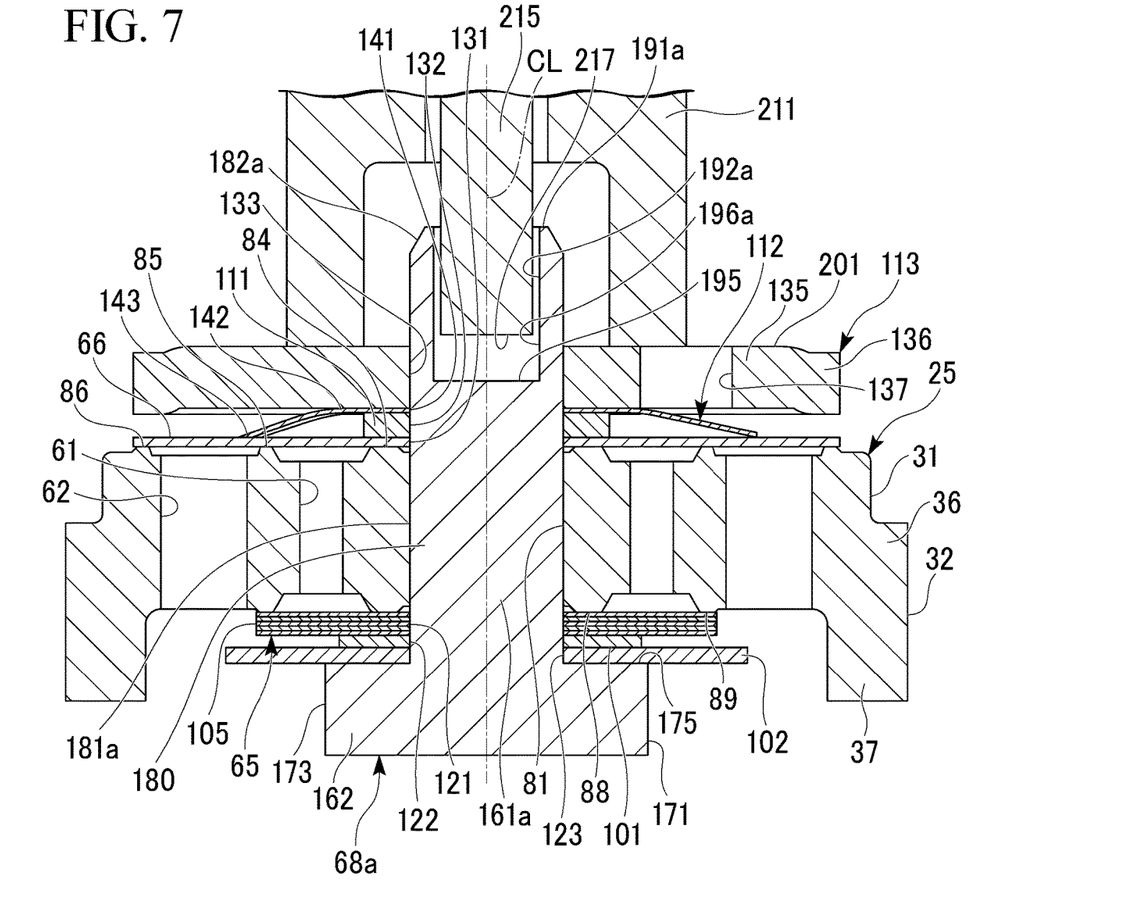
FIG. 7 is a diagram showing a state after a clamping step and a punch insertion step in the method for manufacturing the body valve, which is the assembly of the first embodiment, and is a vertical cross-sectional view at the same cross-section as in FIG. 5.

Next, as shown in FIG. 7, a clamping step is performed in which the end face 201 of the main plate portion 135 of the washer 113 on a side opposite to the flange portion 162 is pressed toward the flange portion 162 by a pressing member 211 of the integration device, and the restriction disc 102, the disc 101, the plurality of discs 105, the valve body 25, the disc valve 66, the disc 111, the spring disc 112, and the washer 113 are clamped between the flange portion 162 and the pressing member 211.

In the state in which the clamping step has been performed, the bottom surface 195 of the axially recessed portion 192a of the fixing pin 68a is located on a side closer to the flange portion 162 in the axial direction than the end face 201 of the washer 113 on the side opposite to the flange portion 162, which is provided on the side most opposite to the flange portion 162 among the restriction disc 102, the disc 101, the plurality of discs 105, the valve body 25, the disc valve 66, the disc 111, the spring disc 112, and the washer 113. Specifically, a position of the bottom surface 195 of the axially recessed portion 192a in the axis CL direction is aligned with the intermediate position of the main plate portion 135 of the washer 113 in the axis CL direction.

Next, a punch insertion step is performed in which a non-circular punch 215 having a maximum diameter larger than a minimum diameter of the axially recessed portion 192a is inserted into the axially recessed portion 192a having a non-circular shape provided on the end face 191a of the shaft portion 161a. In the punch insertion step, the integration device inserts the punch 215 positioned around the central axis CL into the axially recessed portion 192a that is positioned around the central axis CL by positioning the flange portion 162 around the central axis CL. Here, as shown in FIG. 6, a slightly smaller hexagonal columnar punch 215 having six radial protruding portions 214 is inserted into the axially recessed portion 192a that is a hexagonal hole having six radially recessed portions 197a positioned around the central axis CL. In this case, relative positions between the six radially recessed portions 197a and the six radially protruding portions 214 around the axis CL are made to coincide with each other.

In the punch insertion step, as shown in FIG. 7, a tip face 217 of the punch 215 on the insertion side into the axially recessed portion 192a is disposed at a predetermined position on a side that is opposite to the flange portion 162 in the axial direction and closer thereto than the end face 201 of the washer 113 on the side opposite to the flange portion 162. Also, the clamping step and the punch insertion step may be performed in parallel.

Next, the integration device performs a punch rotation step of rotating the punch 215 about the central axis CL while maintaining its position in the axial direction with respect to the end face 201 of the washer 113. Then, the punch 215 presses the inner circumferential surface 196a of the axially recessed portion 192a radially outward with each radially protruding portion 214 and plastically deforms the shaft portion 161a outward in the radial direction. In that case, since the shaft portion 161a has the smallest radius from the central axis CL at an intermediate position between a radially recessed portion 197a and a radially recessed portion 197a adjacent to each other in the circumferential direction, the intermediate position deforms most radially outward. Further, since the six radially recessed portions 197a are recessed, they do not come into contact with the punch 215 and remain as they are. As a result, as shown in FIG. 4, the locking portion 185 having six protruding portions 186 protruding radially outward from the outer circumferential surface 181 configured of the cylindrical surface of the shaft body portion 180 is formed. Thus, as shown in FIG. 2, the fixing pin 68 having the shaft portion 161 in which the locking portion 185 is formed on an outer circumferential portion of a portion of the shaft body portion 180 protruding in the axis CL direction from the washer 113.

An outer circumferential portion of the formed locking portion 185 forms a substantially hexagonal shape. In addition, the axially recessed portion 192 that is recessed from the end face 191 toward the flange portion 162 is formed in the shaft portion 161. As shown in FIG. 4, the axially recessed portion 192 has the base inner circumferential surface 196 having a substantially cylindrical shape, and six radially recessed portions 197 recessed radially outward from the base inner circumferential surface 196. As shown in FIG. 2, the fixing pin 68 sandwiches the restriction disc 102, the disc 101, the plurality of discs 105, the valve body 25, the disc valve 66, the disc 111, the spring disc 112, and the washer 113 between the flange portion 162 and the plurality of protruding portions 186 from both sides in the stacking direction and integrates them in the axial direction.

The clamping step, the punch insertion step, and the punch rotation step described above are an integration step in which the punch 215 is rotated, and the outer circumferential portion of the shaft portion 161a on the side opposite to the flange portion 162 is plastically deformed to protrude radially outward from the inner circumferential surfaces 81, 121 to 123, 131 to 133, and 141 of the restriction disc 102, the disc 101, the plurality of discs 105, the valve body 25, the disc valve 66, the disc 111, the spring disc 112, and the washer 113 which are stacked, thereby integrating the restriction disc 102, the disc 101, the plurality of discs 105, the valve body 25, the disc valve 66, the disc 111, the spring disc 112, and the washer 113 with the fixing pin 68 in the axial direction.

In the clamping step of the integration step, an axial force is applied to the restriction disc 102, the disc 101, the plurality of discs 105, the valve body 25, the disc valve 66, the disc 111, the spring disc 112, and the washer 113 in the axial direction of the fixing pin 68a before the punch 215 is rotated.

In the punch insertion step and the punch rotation step of the integration step, as shown in FIG. 7, the punch 215 is rotated in a state in which the tip face 217 on the insertion side into the axially recessed portion 192a is located on the side that is opposite to the flange portion 162 and closer thereto than the end face 201 on the side opposite to the flange portion 162 of the washer 113.

The restriction step is performed before the integration step. The body valve 10 is assembled by performing the shaft portion insertion step, the restriction step, and the integration step.

Patent Document 1 discloses a base valve manufactured by inserting a pin member into a disc, a lower disc valve, a valve body, an upper disc valve, an upper retainer, a leaf spring, and a stopper, which are stacked, and integrating them in an axial direction thereof. In the manufacturing method of Patent Document 1, a caulked portion is formed by inserting the disc, the lower disc valve, the valve body, the upper disc valve, the upper retainer, the leaf spring, and the stopper into a shaft portion of the pin member, and inserting a punch into a recessed portion for caulking of the shaft portion in the axial direction to press and open a circumferential wall of the recessed portion for caulking by caulking.

In this way, when the shaft portion is caulked, including an axial load component, with the punch, a diameter of a portion of the shaft portion that supports the disc, the lower disc valve, the valve body, the upper disc valve, the upper retainer, the leaf spring, and the stopper in the radial direction may be enlarged. Then, for example, the upper disc valve and the lower disc valve may be displaced in the axial direction with respect to a seat portion of the valve body. In this way, when the upper disc valve and the lower disc valve are displaced in the axial direction with respect to the seat portion of the valve body, there is a possibility of occurrence of variations in valve opening characteristics and damping force characteristics of these valves.

On the other hand, in the body valve 10 of the first embodiment, the fixing pin 68 includes the axially recessed portion 192 that is provided on the end face 191 of the shaft portion 161 on the side opposite to the flange portion 162 and has a non-circular cross-section orthogonal to the axial direction of the shaft portion 161, and the plurality of protruding portions 186 that is provided on the outer circumferential portion of the shaft portion 161 on the side opposite to the flange portion 162 and protrude radially outward from the inner circumferential surfaces 81, 121 to 123, 131 to 133, and 141 of the restriction disc 102, the disc 101, the plurality of discs 105, the valve body 25, the disc valve 66, the disc 111, the spring disc 112, and the washer 113.

In this way, the restriction disc 102, the disc 101, the plurality of discs 105, the valve body 25, the disc valve 66, the disc 111, the spring disc 112, and the washer 113 is integrated with the fixing pin 68 by the plurality of protruding portions 186 protruding radially outward from the inner circumferential surfaces 81, 121 to 123, 131 to 133, and 141 thereof. Since the fixing pin 68 has a shape having the plurality of protruding portions 186 protruding radially outward as described above, the plurality of protruding portions 186 can be formed due to the plastic deformation while a load of the axial component can be reduced. Accordingly, it is possible to reduce enlargement of the diameter of the portion of the shaft portion 161 of which the position is aligned with the disc valves 65 and 66 in the axial direction. For that reason, displacement of the disc valve 65 in the axial direction with respect to the seat portion 89 can be suppressed. In addition, displacement of the disc valve 66 in the axial direction with respect to the inner seat portion 85 and the outer seat portion 86 can also be suppressed. Accordingly, a decrease in assembly accuracy of the body valve 10 can be suppressed, and variations in valve opening characteristics and damping force characteristics can be suppressed.

Further, when the above structure is applied to a plurality of types of body valves 10 having different stacking heights from the flange portion 162 of the circular members such as the disc valve 66, the adjustment can be made only by changing a depth of insertion of the punch 215 into the axially recessed portion 192a in accordance with a height of the stacked circular members, that is, heights of formation positions of the protruding portions 186. Accordingly, it is possible to eliminate switching of stages in a device.

The bottom surface 195 of the axially recessed portion 192 is disposed on a side closer to the valve body 25 than the end face 201 of the washer 113 on a side opposite to the valve body 25, which is located on the side most opposite to the valve body 25. For that reason, the plurality of protruding portions 186 can be formed by plastic deformation such that the restriction disc 102, the disc 101, the plurality of discs 105, the valve body 25, the disc valve 66, the disc 111, the spring disc 112, and the washer 113 are well integrated with the fixing pin 68.

Since the flange portion 162 has a non-circular outer circumference, the rotation of the fixing pin 68 can be restricted by holding the flange portion 162. Accordingly, the plurality of protruding portions 186 can be satisfactorily formed on the fixing pin 68 by plastic deformation such that the restriction disc 102, the disc 101, the plurality of discs 105, the valve body 25, the disc valve 66, the disc 111, the spring disc 112, and the washer 113 are integrated with the fixing pin 68.

Since the washer 113 on the side most opposite to valve body 25 among the restriction disc 102, the disc 101, the plurality of discs 105, the valve body 25, the disc valve 66, the disc 111, the spring disc 112, and the washer 113 limits a movable range of the disc valve 66 between the washer 113 itself and the valve body 25, it has high rigidity and is not easily affected by the plastic deformation of the plurality of protruding portions 186. For this reason, displacement of the disc valve 65 from with respect to the seat portion 89 in the axis CL direction can be further suppressed. In addition, displacement of the disc valve 66 in the axial direction with respect to the inner seat portion 85 and the outer seat portion 86 can also be further suppressed. Accordingly, a decrease in assembly accuracy of the body valve 10 can be further suppressed, and variations in valve opening characteristics and damping force characteristics can be further suppressed.

The method for manufacturing the body valve 10 of the first embodiment includes the shaft portion insertion step and the integration step.

In the shaft portion insertion step, the shaft portion 161a of the fixing pin 68a, which has the shaft portion 161a extending in the axial direction and the flange portion 162 extending radially outward from one end side of the shaft portion 161a, is inserted into the restriction disc 102, the disc 101, the plurality of discs 105, the valve body 25, the disc valve 66, the disc 111, the spring disc 112, and the washer 113.

In the integration step, the punch 215 that has a non-circular shape and has the maximum diameter larger than the minimum diameter of the axially recessed portion 192a is inserted into the axially recessed portion 192a that has a non-circular shape and is provided on the end face 191a of the shaft portion 161a on the other end side to rotate the punch 215, and the outer circumferential portion of the shaft portion 161a on the other end side is plastically deformed to protrude radially outward from the inner circumferential surfaces 81, 121 to 123, 131 to 133, and 141 of the restriction disc 102, the disc 101, the plurality of discs 105, the valve body 25, the disc valve 66, the disc 111, the spring disc 112, and the washer 113, and thus the restriction disc 102, the disc 101, the plurality of discs 105, the valve body 25, the disc valve 66, the disc 111, the spring disc 112, and the washer 113 are integrated with the fixing pin 68.

According to the above manufacturing method, the plurality of protruding portions 186 can be formed by plastic deformation while the load of the axial component is reduced. Accordingly, it is possible to reduce enlargement of the diameter of the portion of the shaft portion 161 of which the position in the axial direction is aligned with the disc valves 65 and 66. For that reason, displacement of the disc valve 65 in the axial direction with respect to the seat portion 89 can be suppressed. In addition, displacement of the disc valve 66 in the axial direction with respect to the inner seat portion 85 and the outer seat portion 86 can be suppressed. Accordingly, a decrease in assembly accuracy of the body valve 10 can be suppressed, and variations in valve opening characteristics and damping force characteristics can be suppressed.

Further, even in a case in which a plurality of types of body valves 10 having different stacking heights from the flange portion 162 of the circular members such as the disc valve 66 are manufactured, adjustment can be made only by changing the depth of insertion of the punch 215 into the axially recessed portion 192a in accordance with the stacking heights. Accordingly, it is possible to eliminate switching of stages in a device.

Also, in the integration step, before the punch 215 is rotated, an axial force is applied to the restriction disc 102, the disc 101, the plurality of discs 105, the valve body 25, the disc valve 66, the disc 111, the spring disc 112, and the washer 113 in the axial direction of the fixing pin 68a. Accordingly, displacement of the disc valve 65 in the axial direction with respect to the seat portion 89 can be further suppressed, and displacement of the disc valve 66 in the axial direction with respect to the inner seat portion 85 and the outer seat portion 86 can be further suppressed. Accordingly, a decrease in assembly accuracy of the body valve 10 can be further suppressed, and variations in valve opening characteristics and damping force characteristics can be further suppressed.

Also, in the integration step, the punch 215 is rotated in a state in which the tip face 217 on the insertion side into the axially recessed portion 192a is located on the side that is opposite to the flange portion 162 and closer thereto than the end face 201 of the washer 113 on the side opposite to the flange portion 162, which is provided on the side most opposite to the flange portion 162 among the restriction disc 102, the disc 101, the plurality of discs 105, the valve body 25, the disc valve 66, the disc 111, the spring disc 112, and the washer 113. Accordingly, the plurality of protruding portions 186 can be formed by plastic deformation while the load of the axial component can be further suppressed. Accordingly, displacement of the disc valve 65 in the axial direction with respect to the seat portion 89 can be further suppressed, and displacement of the disc valve 66 in the axial direction with respect to the inner seat portion 85 and the outer seat portion 86 can be further suppressed. Therefore, a decrease in assembly accuracy of the body valve 10 can be further suppressed, and variations in valve opening characteristics and damping force characteristics can be further suppressed.

Further, before the integration step, the restriction step of holding the outer circumferential surface 171 of the flange portion 162 formed in a non-circular shape and restricting movement of the fixing pin 68 in the rotation direction is included. Accordingly, the shaft portion 161a can be satisfactorily plastically deformed outward in the radial direction by the rotating punch 215.

Also, in the shaft portion 161, the portion between the bottom surface 195 of the axially recessed portion 192 and the plurality of protruding portions 186 is the thinned portion 199 having a thinner thickness than the portion in which the protruding portions 186 are formed and the portion in which the axially recessed portion 192 is not formed. For that reason, when the clamping in the clamping step is released after the integration step, the thinned portion 199 is elastically deformed to expand and acts as a spring element, and thus the body valve 10 can bear a stable residual axial force.

Also, the fixing pin 68, the restriction disc 102, the disc 101, the plurality of discs 105, the valve body 25, the disc valve 66, the disc 111, the spring disc 112, and the washer 113 are materials that can be subjected to heat treatment to be hardened by quenching.

Second Embodiment

Figure 8:
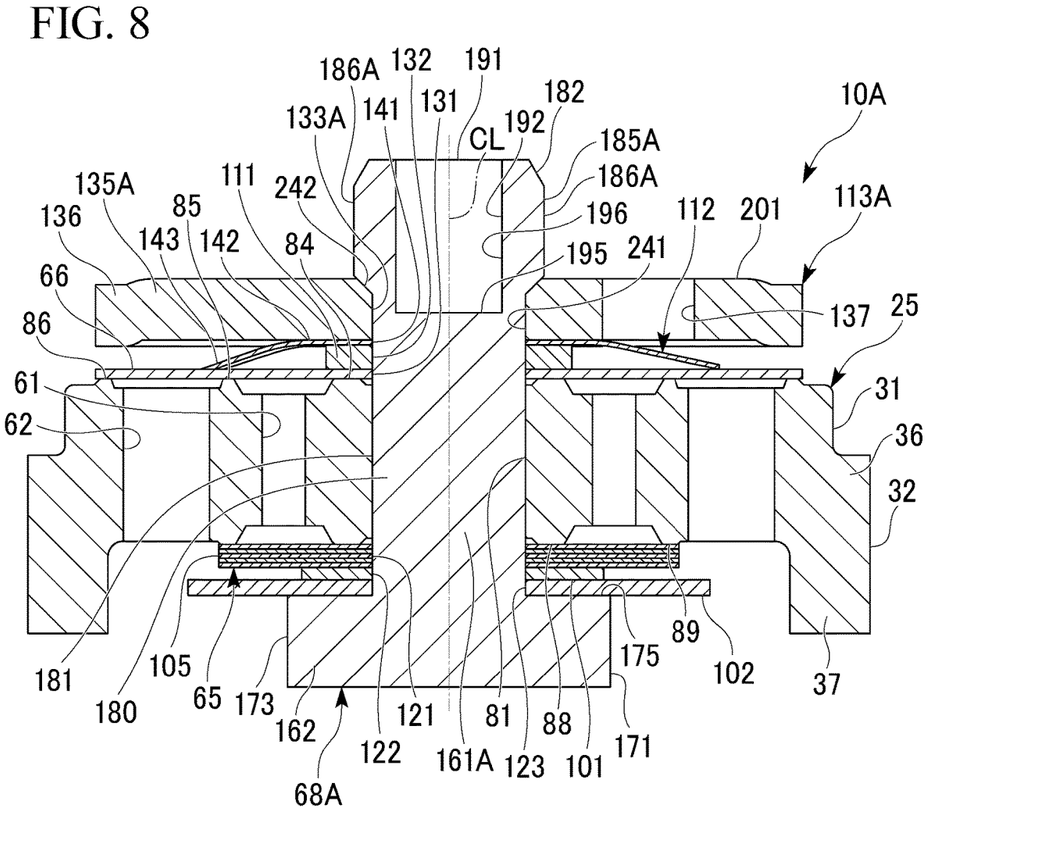
FIG. 8 is a diagram showing a body valve, which is an assembly according to a second embodiment of the present invention, and is a vertical cross-sectional view at a cross-section thereof including an axis CL.

Next, a shock absorber including a body valve, which is an assembly of a second embodiment of the present invention, and a method for manufacturing the same will be described mainly on the basis of FIG. 8 with a focus on differences from the first embodiment. Also, portions that are common to those of the first embodiment will be represented by the same names and the same reference numerals.

In a body valve 10A of the second embodiment, a washer 113A that is partially different from the washer 113 of the first embodiment is used instead of the washer 113 of the first embodiment. The washer 113A has a main plate portion 135A that is partially different from the main plate portion 135 of the first embodiment. An inner circumferential surface 133A of the main plate portion 135A at a center thereof in the radial direction is configured of a cylindrical surface 241 and a tapered surface 242. The tapered surface 242 is formed at an end portion of the inner circumferential surface 133A on a side opposite to an axially protruding side of the annular portion 136 with respect to the main plate portion 135A. The cylindrical surface 241 is disposed on a side closer to the axially protruding side of the annular portion 136 with respect the main plate portion 135A than the tapered surface 242. The tapered surface 242 has a larger diameter as it is separated from the cylindrical surface 241 in the axial direction.

In the body valve 10A of the second embodiment, a fixing pin 68A is partially different from the fixing pin 68 of the first embodiment. A shaft portion 161A of the fixing pin 68A is partially different from the shaft portion 161 of the fixing pin 68. When the shaft portion 161A of the fixing pin 68A is inserted inside the inner circumferential surface 133A of the washer 113A, the washer 113A has a posture in which the tapered surface 242 is oriented toward a side opposite to the flange portion 162 with respect to the cylindrical surface 241. In other words, the washer 113A provided on the side most opposite to the flange portion 162 among the restriction disc 102, the disc 101, the plurality of discs 105, the valve body 25, the disc valve 66, the disc 111, the spring disc 112, and the washer 113A includes the tapered surface 242 on an inner side thereof in the radial direction, which has a larger diameter toward a side opposite to the valve body 25.

The shaft portion 161A has a locking portion 185A that is partially different from the locking portion 185 of the first embodiment. The locking portion 185A has a plurality of protruding portions 186A that are partially different from the protruding portions 186 of the first embodiment, specifically, six protruding portions 186A. All of the plurality of protruding portions 186A abut the tapered surface 242 of the washer 113A.

In the fixing pin 68A, the flange portion 162 abuts the regulation disc 102 on one side in the axial direction, which is located on one end side in the stacking direction among the restriction disc 102, the disc 101, the plurality of discs 105, the valve body 25, the disc valve 66, the disc 111, the spring disc 112, and the washer 113A that are stacked, and the plurality of protruding portions 186A abut the washer 113A on the other side in the axial direction, which is located on the other side in the stacking direction. In that case, the restriction disc 102 abuts the root surface 175 of the flange portion 162, and the washer 113A abuts the plurality of protruding portions 186A on the tapered surface 242 located on a side opposite to the flange portion 162.

The body valve 10A is also an assembly formed by inserting the fixing pin 68A into the restriction disc 102, the disc 101, the plurality of discs 105, the valve body 25, the disc valve 66, the disc 111, the spring disc 112, and the washer 113A, which are a plurality of stacked circular members, and integrating them in the axial direction. In other words, the body valve 10A is an assembly formed by inserting the fixing pin 68A into the valve body 25 having the liquid passages 61 and 62, the disc-shaped restriction disc 102 that opens and closes the liquid passages 61 and 62, the disc 101, the plurality of discs 105, the disc valve 66, the disc 111, the spring disc 112, and the washer 113A and integrating the valve body 25 with the restriction disc 102, the disc 101, the plurality of discs 105, the disc valve 66, the disc 111, the spring disc 112, and the washer 113A in the axial direction.

Next, a method for manufacturing the body valve 10 of the second embodiment will be described.

Also in the second embodiment, the shaft portion insertion step, the restriction step, and the clamping step are performed in the same manner as in the first embodiment. In the shaft portion insertion step, the washer 113A is oriented to have the tapered surface 242 in a direction in which it has a larger diameter toward the side opposite to the valve body 25 inward in the radial direction, and then the shaft portion 161a of the fixing pin 68a is inserted.

Next, a punch insertion step of inserting the punch 215 that has a non-circular shape and has the maximum diameter larger than the minimum diameter of the axially recessed portion 192a into the axially recessed portion 192a that has a non-circular shape and is located in the shaft portion 161a shown in FIG. 6 is performed. The punch insertion step of the second embodiment is partially different from the punch insertion step of the first embodiment, and the tip face 217 of the punch 215 on the insertion side into the axially recessed portion 192a shown in FIG. 7 is positioned on the same plane as the end face 201 of the washer 113 on the side opposite to the flange portion 162. Here, the clamping step and the punch insertion step can also be performed in parallel.

Next, a punch rotation step is performed. Then, the punch 215 presses the inner circumferential surface 196a of the axially recessed portion 192a radially outward with the radially protruding portions 214 and plastically deforms the shaft portion 161a outward in the radial direction. As a result, the fixing pin 68A having the shaft portion 161A in which the locking portion 185A having six protruding portions 186A that protrude radially outward from the outer circumferential surface 181 configured of the cylindrical surface of the shaft body portion 180 has been formed on the outer circumferential portion of the portion of the shaft body portion 180 that protrudes from the washer 113A in the axis CL direction is formed.

The outer circumferential portion of the formed locking portion 185A forms a substantially hexagonal shape. Further, the axially recessed portion 192 recessed from the end face 191 toward the flange portion 162 is formed in the shaft portion 161A. This fixing pin 68A sandwiches the restriction disc 102, the disc 101, the plurality of discs 105, the valve body 25, the disc valve 66, the disc 111, the spring disc 112, and the washer 113 between the flange portion 162 and the plurality of projecting portions 186A from both sides in the stacking direction and integrates them in the axial direction.

In the integration step of the second embodiment including the clamping step, the punch insertion step, and the punch rotation step, the punch 215 is rotated in the punch insertion step and the punch rotation step in the state in which the tip face 217 on the insertion side into the axially recessed portion 192a is located on the same plane as the end face 201 on the side opposite to the flange portion 162 of the washer 113.

In the body valve 10A of the second embodiment, the washer 113A includes the tapered surface 242 that has a larger diameter toward the side opposite to the valve body 25 inward in the radial direction, and thus the plurality of protruding portions 186A can be caused to abut the tapered surface 242. Thus, since the plurality of protruding portions 186A formed by the plastic deformation can be released due to the tapered surface 242, an axial force generated by the fixing pin 68A can be stably left. That is, a component force of the force applied by the plurality of plastically deformed protruding portions 186A abutting the tapered surface 242 can be left as an axial force applied in the axis CL direction. This axial force is a force that sandwiches the restriction disc 102, the disc 101, the plurality of discs 105, the valve body 25, the disc valve 66, the disc 111, the spring disc 112, and the washer 113 between the flange portion 162 and the plurality of protruding portions 186A from both sides in the stacking direction and integrates them in the axial direction.

In the first and second embodiments described above, as shown in FIG. 6, the hexagonal columnar punch 215 having six radially protruding portions 214 has been inserted into and rotated in the shaft portion 161a including the axially recessed portion 192a, which is a hexagonal hole having six radially recessed portions 197a. In addition, as a result, as shown in FIG. 4, the case of forming the substantially hexagonal locking portion 185 having six protruding portions 186 or the substantially hexagon-shaped locking portion 185A having six protruding portions 186A has been described as an example. However, they are not limited to only six locations, and it is sufficient that at least one protruding portion 186 or 186A is provided on the outer circumferential portion of the shaft portions 161 or 161A.

Figure 9:
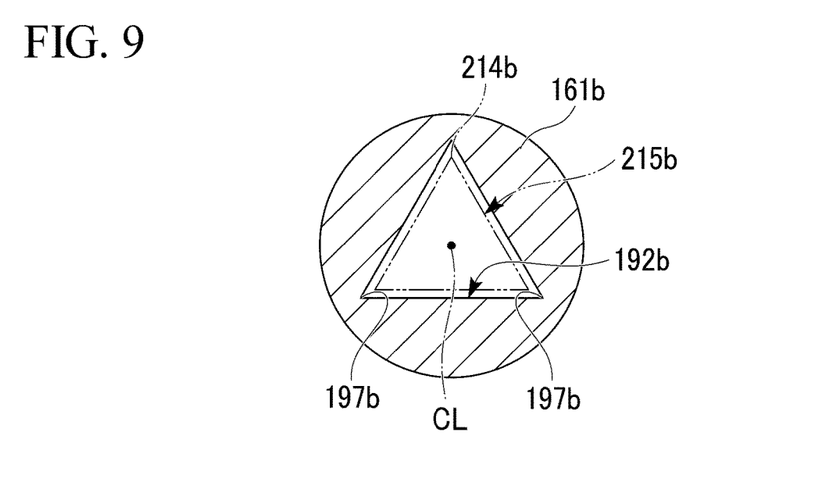
FIG. 9 is a diagram showing a modified example of each of the above embodiments and is a horizontal cross-sectional view of a shaft portion before the punch rotation step at the same cross-section as in FIG. 6.

For example, as shown in FIG. 9, a triangular columnar punch 215b having three radially protruding portions 214b may be inserted into a shaft portion 161b and rotated, which has an axially recessed portion 192b that is a triangular hole in which radially recessed portions 197b are formed at three locations at equal intervals in the circumferential direction. In this case, although not shown, a substantially triangular locking portion having three protruding portions in the radial direction can be formed on the shaft portion.

Figure 10:
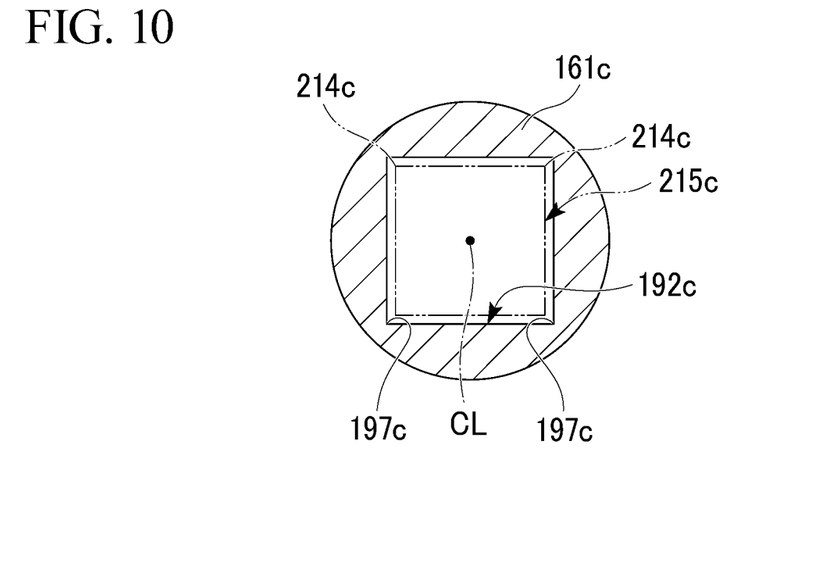
FIG. 10 is a diagram showing another modified example of each of the above embodiments and is a horizontal cross-sectional view of a shaft portion before the punch rotation step at the same cross-section as in FIG. 6.

Further, for example, as shown in FIG. 10, it is also possible to form a square hole in which radially recessed portions 197c are formed at four locations at equal intervals in the circumferential direction. In this case, a square columnar punch 215c having four radially protruding portions 214c is inserted into a shaft portion 161c, which has an axially recessed portion 192c, and rotated. Then, although not shown, a substantially quadrangular locking portion having four protruding portions protruding in the radial direction can be formed on the shaft portion.

Figure 11:
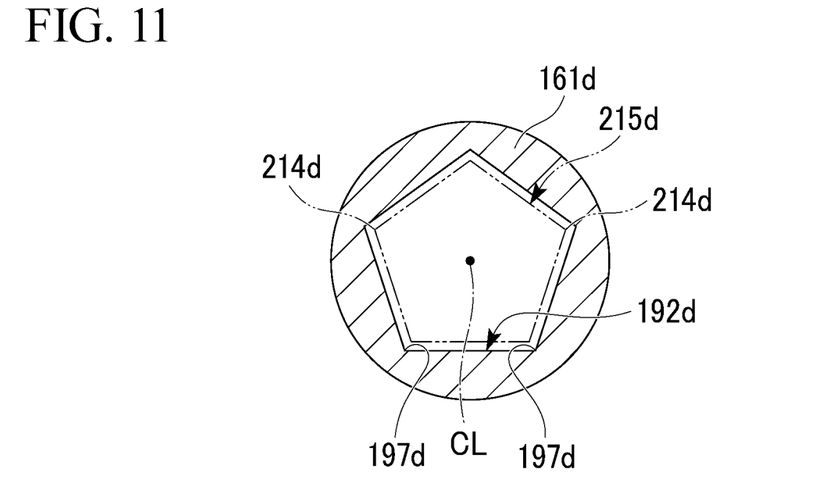
FIG. 11 is a diagram showing still another modified example of each of the above embodiments and is a horizontal cross-sectional view of a shaft portion before the punch rotation step at the same cross-section as in FIG. 6.

Also, for example, as shown in FIG. 11, a pentagonal columnar punch 215d having five radially protruding portions 214d may be inserted into a shaft portion 161d and rotated, which has an axially recessed portion 192d that is a pentagonal hole in which radially recessed portions 197d are formed at five locations at equal intervals in the circumferential direction. In this case, although not shown, a substantially pentagonal locking portion having five protruding portions in the radial direction can be formed on the shaft portion.

Further, as the number of protruding portions that protrude in the radial direction increases, plastic working allowance decreases, which is an amount of protrusion of the protruding portions. On the other hand, in terms of cost, one that forms the substantially hexagonal locking portion 185 is the cheapest, next, one that forms the substantially quadrangular locking portion becomes cheaper, and as compared to these, one that forms the substantially pentagonal locking portion and one that forms the substantially triangular locking portion are higher. One that forms the substantially quadrangular locking portion having four protruding portions is excellent in terms of securing the plastic working allowance of the protruding portions and a balance of cost.

A first aspect of each of the above-described embodiments is an assembly including a plurality of stacked circular members, and a fixing pin that is disposed inside each of the circular members to arrange and integrate each of the circular members in an axial direction thereof, in which the fixing pin includes a shaft portion extending in the axial direction, a flange portion extending radially outward from one end side of the shaft portion, a recessed portion that is provided on an end face of the shaft portion on the other side and has a non-circular cross-section orthogonal to the axial direction, and one or a plurality of protruding portions that are provided on an outer circumferential portion of the shaft portion on the other end side and protrude radially outward from an inner circumferential surface of each of the circular members.

As a result, a decrease in assembly accuracy can be suppressed.

A second aspect is that, in the first aspect, a bottom surface of the recessed portion is disposed on a side closer to the flange portion than an end face of a circular member on a side opposite to the flange portion, which is provided on a side most opposite to the flange portion among the circular members.

A third aspect is that, in the first or second aspect, an outer circumference of the flange portion is non-circular.

A fourth aspect is that, in any one of the first to third aspects, the circular member provided on the side most opposite to the flange portion among the circular members has a tapered surface on an inner side in the radial direction, which has a larger diameter toward the side opposite to the flange portion.

A fifth aspect is a shock absorber including a cylinder, a piston provided in the cylinder, a rod of which one end is connected to the piston and the other end extends from the cylinder, and a body valve that defines the cylinder into two chambers, in which the body valve includes a valve body having a liquid passage, at least one disc-shaped valve member that opens and closes the liquid passage, and a fixing pin that is disposed inside the valve body and the valve member to arrange and integrate the valve body and the valve member in an axial direction thereof, and the fixing pin includes a shaft portion extending in the axial direction, a flange portion extending radially outward from one end side of the shaft portion, a recessed portion that is provided on an end face of the shaft portion on the other side and has a non-circular cross-section orthogonal to the axial direction of the shaft portion, and one or a plurality of protruding portions that are provided on an outer circumferential portion of the shaft portion on the other end side and protrude radially outward from an inner circumferential surface of each circular member.

As a result, a decrease in the assembly accuracy of the body valve can be suppressed, and variations in valve opening characteristics and damping force characteristics of the body valve can be suppressed.

A sixth aspect is that, in the fifth aspect, a bottom surface of the recessed portion is disposed on a side closer to the valve body than an end face of the valve member on a side opposite to the valve body, which is located on a side most opposite to valve body.

A seventh aspect is that, in the fifth or sixth aspect, an outer circumference of the flange portion is non-circular.

An eighth aspect is that, in any one of the fifth to seventh aspects, a plurality of the valve members are provided, and a valve member of the valve members located on a side most opposite to the valve body is a washer that limits a movable range of the valve members between the valve members and the valve body.

A ninth aspect is that, in the eighth aspect, the washer has a tapered surface on an inner side in the radial direction, which has a larger diameter toward the side opposite to the valve body.

A tenth aspect is a method for manufacturing an assembly in which a fixing pin is disposed inside a plurality of stacked circular members to arrange and integrate the circular members in an axial direction thereof, including: a shaft portion insertion step of inserting a shaft portion of the fixing pin into the plurality of circular members, the fixing pin including the shaft portion extending in the axial direction and a flange portion extending radially outward from one end side of the shaft portion; and an integration step of inserting a non-circular punch having the maximum diameter larger than the minimum diameter of the recessed portion into a non-circular recessed portion provided on an end face of the shaft portion on the other end side to rotate the punch, plastically deforming an outer circumferential portion of the shaft portion on the other end side to protrude radially outward from an inner circumferential surface of the circular members, and integrating the plurality of circular members with the fixing pin.

As a result, a decrease in assembly accuracy of the assembly can be suppressed.

An eleventh aspect is that, in the tenth aspect, when the integration step is performed, an axial force is applied to the plurality of circular members in the axial direction before the punch is rotated.

A twelfth aspect is that, in the tenth or eleventh aspect, in the integration step, the punch is rotated in a state in which a tip face thereof on an insertion side into the recessed portion is located on the same plane as an end face of a circular member on a side opposite to the flange portion, the circular member being provided on a side most opposite to the flange portion among the plurality of circular members, or on a side opposite to the flange portion and closer thereto than the end face.

A thirteenth aspect is that, in any one of the tenth to twelfth aspects, before the integration step, a restriction step of holding an outer circumferential surface of the flange portion formed in a non-circular shape and restricting movement of the fixing pin in a rotational direction thereof is further provided.

INDUSTRIAL APPLICABILITY

According to the present invention, it is possible to provide an assembly, a shock absorber, and a method for manufacturing an assembly, in which a decrease in assembly accuracy can be inhibited. Accordingly, it has an excellent industrial applicability.

BRIEF DESCRIPTION OF THE REFERENCE SYMBOLS 10,10A Body valve (assembly)
11 Shock absorber
17 Cylinder
25 Valve body (circular member)
45 Piston
48 First chamber
49 Second chamber
51 Rod
61, 62 Liquid passage
66 Disc valve (circular member or valve member)
68, 68a, 68A Fixing pin
81, 121 to 123, 131 to 133 Inner circumferential surface
101 Disc (circular member or valve member)
102 Restriction disc (circular member or valve member)
105 Disc (circular member or valve member)
111 Disc (circular member or valve member)
112 Spring disc (circular member or valve member)
113, 113A Washer (circular member or valve member)
161, 161a, 161A Shaft portion
162 Flange portion
171 Outer circumferential surface
186,186A Protruding part
191 End face
192,192a Axially recessed portion (recessed portion)
195 Bottom surface
201 End face
215 Punch
217 Tip face
242 Tapered surface

The invention claimed is:

1. A method for manufacturing an assembly in which a fixing pin is disposed inside a plurality of stacked circular members to arrange and integrate the circular members in an axial direction thereof, comprising:

a shaft portion insertion step of inserting a shaft portion of the fixing pin into the plurality of circular members, the fixing pin including the shaft portion extending in the axial direction and a flange portion extending radially outward from one end side of the shaft portion; and an integration step of inserting a non-circular punch into a non-circular recessed portion provided on an end face of the shaft portion on the other end side to rotate the punch, having the maximum diameter larger than the minimum diameter of the non-circular recessed portion, plastically deforming an outer circumferential portion of the shaft portion on the other end side to protrude radially outward from an inner circumferential surface of the circular members, and integrating the plurality of circular members with the fixing pin.

2. The method for manufacturing an assembly according to claim 1, wherein in the integration step, an axial force is applied to the plurality of circular members in the axial direction before the punch is rotated.

3. The method for manufacturing an assembly according to claim 1, wherein, in the integration step, the punch is rotated in a state in which a tip face thereof on an insertion side into the recessed portion is located on the same plane as an end face of a circular member on a side opposite to the flange portion, the circular member being provided on a side most opposite to the flange portion among the plurality of circular members, or on a side opposite to the flange portion and closer thereto than the end face.

4. The method for manufacturing an assembly according to claim 1, further comprising, before the integration step, a restriction step of holding an outer circumferential surface of the flange portion formed in a non-circular shape and restricting movement of the fixing pin in a rotational direction thereof.

* * * * *